United States Patent

Jones

[15] 3,638,332
[45] Feb. 1, 1972

[54] WRITING READINESS PAPER

[72] Inventor: Ann M. Jones, Route 1, Box 286, Greenville, N.C. 27834

[22] Filed: Mar. 6, 1970

[21] Appl. No.: 17,067

[52] U.S. Cl. ............................................................. 35/37
[51] Int. Cl. ....................................................... G09b 11/04
[58] Field of Search ............................... 35/36, 37; 283/66 R

[56] References Cited

UNITED STATES PATENTS

| | | | |
|---|---|---|---|
| D39,492 | 9/1908 | Guy | D74/1 |
| 1,253,758 | 1/1918 | Wilkes | 35/37 |
| 3,363,336 | 1/1968 | Skinner | 35/36 |
| 3,363,337 | 1/1968 | Skinner et al. | 35/36 |
| 3,363,338 | 1/1968 | Skinner et al. | 35/36 |
| 2,277,329 | 3/1942 | Kimbrough | 35/37 |
| 1,227,653 | 5/1917 | Pennewill | 283/66 R |

FOREIGN PATENTS OR APPLICATIONS

| | | | |
|---|---|---|---|
| 4,383 | 1903 | Great Britain | 35/36 |

*Primary Examiner*—Wm. H. Grieb
*Attorney*—Shlesinger, Arkwright & Garvey

[57] ABSTRACT

Writing readiness paper for aiding teachers in teaching very young children to print on the proper lines thereof consisting of a sheet of paper having a plurality of series of different colored horizontal parallel lines thereon, each of the series of colored lines comprising an upper green line and a lower red line, the green and red lines being separated by a first writing band, a yellow line dividing the first writing band substantially in half, a second writing band of a width substantially half that of the first writing band for separating each of the series of colored lines, the second writing band being colored so as to visibly distinguish the second writing band from the first writing band.

5 Claims, 1 Drawing Figure

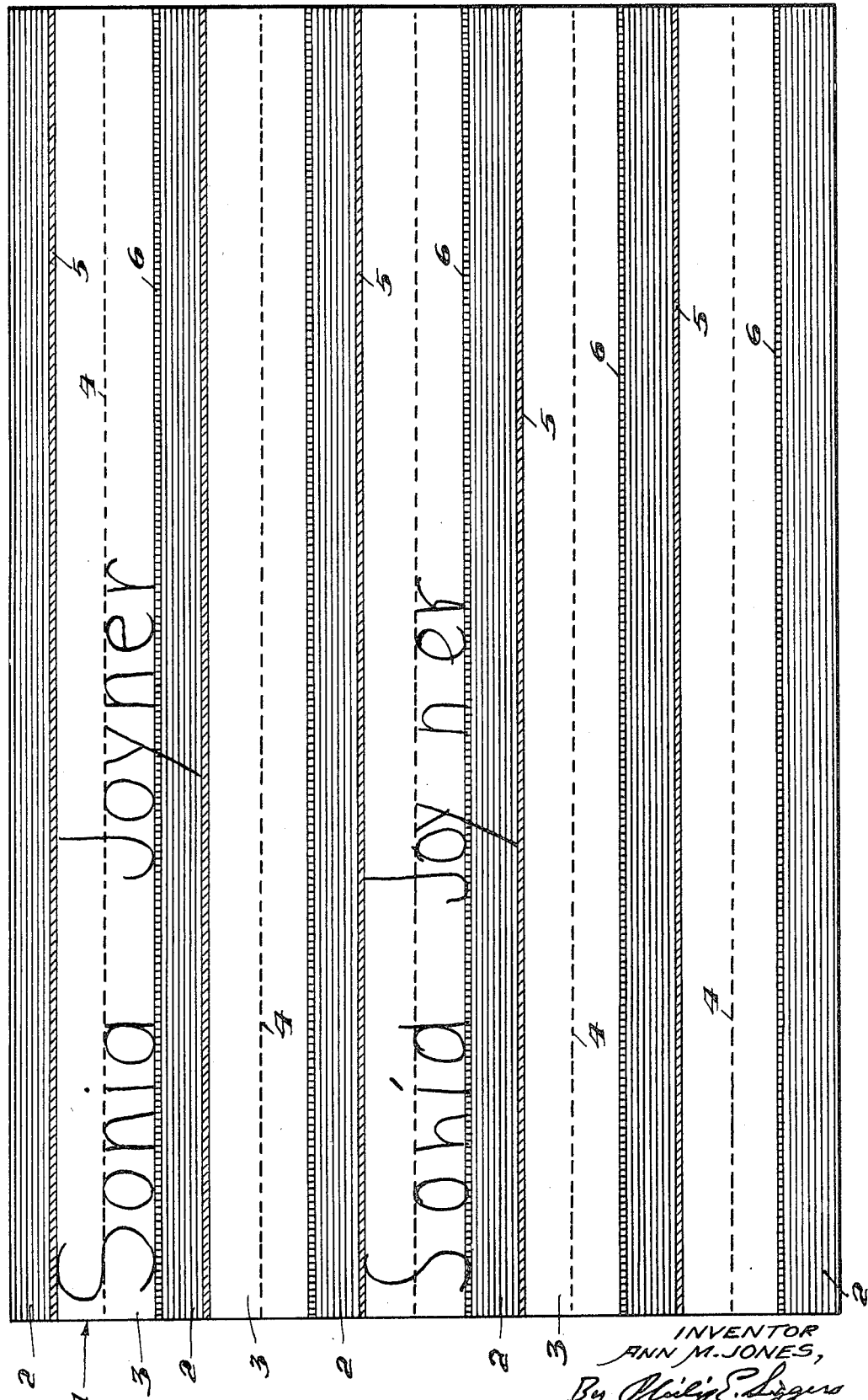
INVENTOR
ANN M. JONES,
ATTORNEY

WRITING READINESS PAPER

OBJECTS AND ADVANTAGES OF THE INVENTION

The principal objects of the invention are to provide a sheet of paper so designed that it will aid a teacher in teaching very young children how to write, also to aid and motivate such children, also to provide a method of teaching which involves an appeal to the play instincts of children.

Writing paper for children who must be taught to write is now in use in North Carolina and other schools, consisting of sheets of paper printed with horizontal parallel lines providing spaces in which to write, such spaces being divided into two equal parts by horizontal dotted or dash lines which guide the child when writing capital and lower case letters.

The present invention provides paper which employs all the features of the described writing paper but adds other features which appeal to the imagination and love of play of a young child who is familiar with motor vehicle traffic and traffic controls including green, yellow and red lights. These additional features, it has been demonstrated in North Carolina schools, make it much easier to teach young children to write and besides add to the pleasure of learning and teaching.

An embodiment of the invention is shown in the accompanying drawing forming a part of this specification. Said drawing shows in full size a sheet of paper printed in colors to provide spaced manuscript lines. The colors are indicated in the manner required by Rule 84(g) of the Rules of Practice of the United States Patent Office.

Referring particularly to the drawing, a sheet of paper 1 is printed with horizontal equally spaced darkened stripes or bands 2, preferably colored blue, the bands 2 extending the entire length of the sheet and being separated by uncolored, preferably white, spaces 3 which are of uniform width and are substantially wider than the bands 2. Each of the white spaces 3 provides a manuscript line and each is divided into two equal parts by a yellow dotted or dash line 4 which aids a pupil when writing lower case and capital letters in the manuscript line. At the top of each manuscript line is a green line 5 which is contiguous to a blue band 2, and at the bottom of each manuscript line is a read line 6 which is contiguous to a blue band 2.

The teacher gives the child an example of good writing, as shown in the top manuscript line, where a child's name "Sonia Joyner" is reproduced. FIGURE teaching the child, the teacher says that a green line 5 means "start" or "go," like a green traffic light. The pencil or other writing instrument starts marking at the green line and goes down into the street or road represented by the manuscript line 3. Mostly the pencil stays below the yellow or "go slow" line 4, as lower case letters are formed. The red line 6 indicates "danger" or "stop" as the adjacent blue band 2 is supposed to indicate a sidewalk or perhaps a ditch. The Figure shows the child's writing of her name, imitating as closely as a beginner can the example of good writing at the top of the sheet.

Instead of solid blue bands or strips 2, other colored or darkened bands may be provided. The sheet does not have to be white: it could be pale pink or pale blue with darkened bands of the same color. The important thing is to have easily followed manuscript lines 3 well spaced apart. The red lines 6 could be adjacent red-hatched bands, but the hatching must be such as to show clearly the lower portions of such written letters as g, p and y.

This application is a companion to design application, Ser. No. D-17,087, filed by me May 8, 1969 and now abandoned.

Having described my invention, what I claim as new and desire to secure by letters patent is:

1. Writing readiness paper for aiding teachers in teaching very young children to print on the proper lines thereof consisting of:
   a. a sheet of paper,
   b. a plurality of series of different colored horizontal parallel lines on said sheet of paper,
   c. each of said series of colored lines comprising an upper green line and a lower red line, said green line and said red line being separated by a first writing band,
   d. a yellow line dividing said first writing band substantially in half,
   e. a second writing band of a width substantially half that of said first writing band for separating each of said series of colored lines,
   f. said second writing band being colored so as to visibly distinguish said second writing band from said first writing band.

2. Writing readiness paper as in claim 1 and wherein:
   a. said yellow line is dotted.

3. Writing readiness paper as in claim 1 and wherein:
   a. said yellow line is dashed.

4. Writing readiness paper as in claim 1 and wherein:
   a. said yellow line is solid.

5. Writing readiness paper for aiding teaches in teaching very young children to print on the proper lines thereof utilizing the traffic signal principle of stop and go consisting of:
   a. a sheet of paper,
   b. a plurality of series of different colored horizontal parallel lines on said sheet of paper,
   c. each of said series of colored lines comprising a green line and a red line,
   d. a first writing band separating said red and green lines,
   e. a yellow line dividing said first writing band substantially in half,
   f. a second writing band separating one series of different colored lines from the next adjacent series of different colored lines and being darkened so as to visibly distinguish said second writing band from said first writing band and thus distinguish said one series of different colored line from said next adjacent series of different colored lines, and
   g. said second writing band being at least substantially half the width of said first writing band.

* * * * *